No. 729,657.

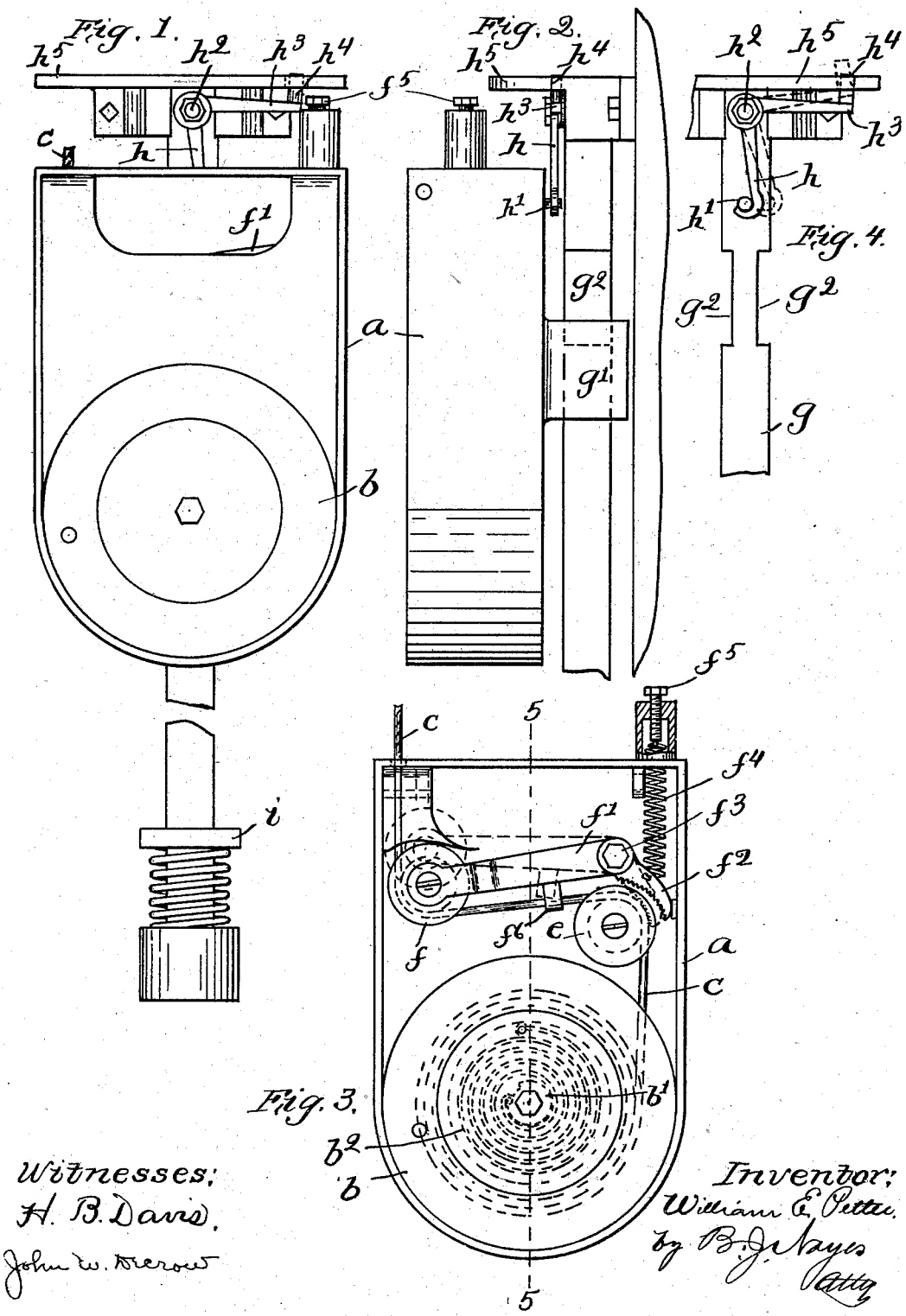

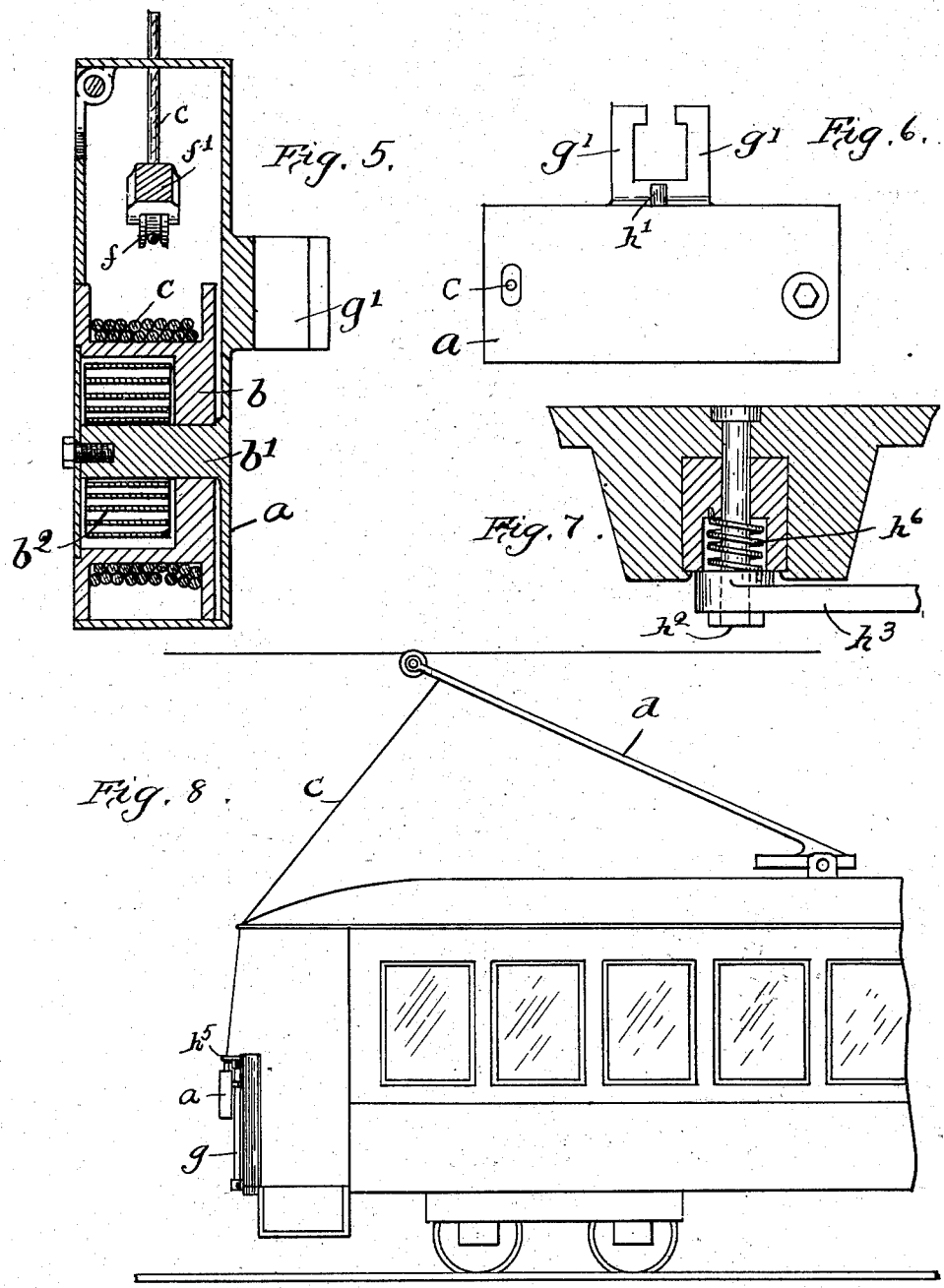

Patented June 2, 1903.

UNITED STATES PATENT OFFICE.

WILLIAM E. PETTEE, OF NEWTON, MASSACHUSETTS; CLARA M. PETTEE ADMINISTRATRIX OF SAID WILLIAM E. PETTEE, DECEASED.

TROLLEY-CATCHER.

SPECIFICATION forming part of Letters Patent No. 729,657, dated June 2, 1903.

Application filed February 21, 1901. Serial No. 48,271. (No model.)

*To all whom it may concern:*

Be it known that I, WILLIAM E. PETTEE, of Newton, in the county of Middlesex and State of Massachusetts, have invented an Improvement in Trolley-Catchers, of which the following description, in connection with the accompanying drawings, is a specification, like letters on the drawings representing like parts.

This invention relates to trolley-catchers, and has for its object to provide the locking device, which forms the essential part of the pole-catching mechanism, with a cord-deflecting arm, which engages and deflects the cord, and which is adapted to be operated by a sudden pull upon the cord—as, for instance, when the trolley leaves the wire—to actuate said locking device and thereby catch the pole; and the invention also has for its object to provide improved means for drawing down the pole when said locking device is actuated.

The invention consists, essentially, in the combination, with a trolley-pole, its cord, and a spring-actuated reel for the slack cord, of a locking device, a spring for holding it in its unlocked or disengaging position, a cord-deflecting arm for operating said locking device, which engages and deflects the cord and which is operated by a sudden pull upon the cord to actuate said locking device; also, in the combination, with a trolley-pole, its cord, and a spring-actuated reel for the slack cord, of a cord-holder over which the cord passes, a gripping-jaw adapted when operated to impinge the cord on said cord-holder, and a cord-deflecting arm for operating said gripping-jaw, which normally engages and deflects the cord and which is adapted to be operated by a sudden pull upon the cord; also, in the combination, with a trolley-pole, its cord, and a spring-actuated reel for the slack cord, of pole-catching mechanism adapted to be operated by a sudden pull upon the cord, a case for said reel and pole-catching mechanism, a detent for holding said case in elevated position, adapted to be operated to release said case when the pole is caught, so that said case by falling will serve as a weight to draw down the pole.

Figure 1 shows in front elevation a trolley-catcher embodying this invention. Fig. 2 is a side elevation of the trolley-catcher shown in Fig. 1. Fig. 3 is a front view of the case with its front plate or wall removed, showing the spring-actuated reel and pole-catching mechanism. Fig. 4 is a detail of the upright bar which supports the case and the detent for holding said case in elevated position. Fig. 5 is a vertical section of the case and parts contained therein, taken on the dotted line 5 5, Fig. 3. Fig. 6 is a top view of the case. Fig. 7 is a sectional detail of the detent. Fig. 8 is a view illustrating my device as applied to a car.

$a$ represents the case or shell, which is of any suitable shape and size to provide an inclosure for the operating parts and also to serve as a support therefor.

$b$ represents the reel, which is journaled to said shell or case, being mounted to revolve freely upon a stud $b'$, which, as herein shown, projects forward from the rear wall of the case. The reel $b$ is hollowed out to provide a circular opening for the spring $b^2$, one end of which is connected to the reel and the other end to the post $b'$. The front end of the reel occupies a position in a circular opening in the front wall of the case, being thereby exposed, consequently accessible. This reel serves as a spring-actuated reel for the cord $c$, which is connected to the trolley-pole $d$ and operates to take up the slack cord and to pay it out as required. The trolley-cord $c$ passes from the reel $b$ over a disk or roll $e$, which I herein term the "cord-holding disk" or "cord-holder," and from said disk it passes over the roll $f$, which is pivotally supported at the extremity of an arm $f'$, and it then passes up through a hole in the top wall of the case to the pole.

The pole-catching mechanism comprises, essentially, a locking device, which is normally held disengaged, but which is adapted to be operated by a sudden pull upon the cord.

The locking device herein shown is constructed and arranged to grip the cord and by holding it firmly "catch" the pole, and comprises a gripping-jaw $f^2$, pivoted at $f^3$ and arranged to impinge the cord upon the cord-holder $e$. The arm $f'$ is formed integral with or connected to said gripping-jaw $f^2$, yet so far as my invention is concerned it may be otherwise arranged to operate said gripping-jaw, and said arm is arranged to continuously engage and to deflect the cord more or less, and therefore said arm is herein termed a "cord-deflecting arm." The gripping-jaw $f^2$ is normally held in disengaging position by means of a spring $f^4$, which is connected to it, and which is also connected to an adjusting-screw $f^5$, by means of which its tension may be regulated.

It will be seen that, as the cord is more or less deflected out of straight by the cord-deflecting arm, a sudden pull upon the cord will lift said arm, and thereby cause the gripping-jaw to impinge the cord upon the cord-holder and lock it, and consequently catch the pole.

I am aware that a cord-deflecting arm has been employed for operating a releasing device for mechanism provided for drawing down a trolley-pole; but, so far as I am aware, I am the first to employ a cord-deflecting arm for operating a locking device for catching the pole, and consequently broadly include the same within the spirit and scope of this invention.

On the cord-deflecting arm $f'$ an eye $f^6$ is provided for the cord, which assists in guiding it and holding it in proper position to pass around or over the end of the cord-deflecting arm.

The cord-holding disk $e$ is disposed eccentrically, so that when the gripping-jaw $f^2$ is actuated and impinges the cord thereon said disk by turning will further assist in gripping the cord.

The locking device and cord-deflecting arm for operating it, which constitutes the pole-catching mechanism, are contained within the case $a$, and thereby protected, and the cord $c$ passes out through a hole in the top wall thereof.

The invention so far described is especially adapted for catching the pole when the trolley leaves the wire, and is operated, as will be obvious, by a sudden pull upon the cord.

As a means of drawing down the pole I have mounted the case $a$, containing the spring-actuated reel and pole-actuating mechanism, on an upright bar $g$, on which it is free to slide up and down, and said case and parts supported by it are sufficiently heavy to serve as a weight to draw down the pole when released and allowed to fall by gravity.

The case is removably connected to the upright bar, so that it may be removed therefrom to be applied at either end of a car; and, as herein shown, said case $a$ has formed upon or secured to the rear side of its rear wall a pair of guide-ears $g'$ $g'$, which embrace the upright bar, and said upright bar is cut away, as at $g^2$ $g^2$, to permit said guide-ears to be brought into engagement with the bar. The case $a$ when mounted on the bar is held in elevated position by a detent $h$ engaging a pin $h'$, projecting rearwardly from the rear wall of the case. The detent $h$ is made as a bell-crank lever and is pivoted at $h^2$ to the frame, and one arm of said lever has a hooked end to engage the pin $h'$ and the other arm, as $h^3$, has formed or provided on it a suitable projection $h^4$, which is adapted to project up through a hole in a plate $h^5$, to be pressed upon by the hand to restore the arm $h$ into locking engagement with the pin $h'$.

The detent has connected with it a spring $h^6$, (see Fig. 7,) which is provided for the purpose of automatically turning it whenever it is released and thereby permitted to act.

It will be seen that whenever the case is disengaged from the detent it will fall by gravity and slide down the bar $g$ and while doing so will draw down the pole.

At the lower end of the bar a suitable spring-supported buffer $i$ may be provided, if desired. The operation of this part of my invention is as follows: When the trolley leaves the wire and suddenly pulls upon the cord, the pole-catching mechanism is operated—as, for instance, as herein shown, the cord-deflecting arm is operated to grip the cord and thereby catch the pole, and as said pole is suddenly caught the jerk will be sufficient to lift the case a little, far enough to allow the detent to be disengaged, and as soon as it is disengaged it will be moved by its spring to one side, and thereby permit the case to fall by gravity.

I claim—

1. The combination with a trolley-pole, its cord, a spring-actuated reel for the slack cord, pole-catching mechanism adapted to be operated by a sudden pull upon the cord, and a case for said reel and pole-catching mechanism having guide-ears, of an upright bar on which said case is free to slide, a detent for holding said case in its elevated position and means for operating said detent when the pole is caught to thereby release the case, permitting it to fall and to thereby serve as a weight to draw down the pole, substantially as described.

2. The combination of a trolley-pole, its cord, a spring-actuated reel for the slack cord, pole-catching mechanism adapted to be operated by a sudden pull upon the cord, a case for said reel and pole-catching mechanism having guide-ears, an upright bar on which said case is removably mounted and on which it is free to slide, a detent for holding said case in its elevated position and means for operating said detent when the pole is caught to thereby release the case, permitting it to fall and to thereby serve as a weight to draw down the pole, substantially as described.

3. The combination of a trolley-pole, its cord, a spring-actuated reel for the slack cord, pole-catching mechanism adapted to be operated by a sudden pull upon the cord, a case for said reel and pole-catching mechanism having guide-ears, an upright bar on which said case is free to slide, a spring-actuated detent for holding said case in its elevated position, which releases said case, permitting it to fall and draw down the pole, when said case is lifted by a sudden pull upon the cord, substantially as described.

4. The combination with a trolley-pole, its cord, a spring-actuated reel for the slack cord, a case for said reel, a detent for holding said case in elevated position, and means for catching the pole and for bodily lifting the case free from said detent, operated by a sudden pull upon the cord, to thereby permit said case and parts supported by it to fall and draw down the pole, substantially as described.

5. The combination with a trolley-pole, its cord, a spring-actuated reel for the slack cord, a case for said reel, a detent for holding said case in elevated position, and means for catching the pole and for bodily lifting the case free from said detent, operated by a sudden pull upon the cord, to thereby permit said case and parts supported by it to fall and draw down the pole, and automatic means for operating said detent when the case is lifted, substantially as described.

6. The combination with a trolley-pole, its cord, a spring-actuated reel for the slack cord, a case for said reel, a detent for holding said case in elevated position, and means for catching the pole and for bodily lifting the case free from said detent, operated by a sudden pull upon the cord, to thereby permit said case and parts supported by it to fall and draw down the pole, automatic means for operating the said detent when the case is lifted, and a restoring-arm on said detent, substantially as described.

7. The combination with a trolley-pole, its cord, a spring-actuated reel for the slack cord, a case for said reel, an upright support on which said case is free to slide, a detent for holding said case in elevated position, and means for catching the pole and for bodily lifting the case free from said detent, operated by a sudden pull upon the cord, to thereby permit said case and parts supported by it to fall and draw down the pole, substantially as described.

8. The combination with a trolley-pole, its cord, a spring-actuated reel for the slack cord, a case for said reel, an upright support to which said case is removably connected and on which it is free to slide, a detent for holding said case in elevated position, and means for catching the pole and for bodily lifting the case free from said detent, operated by a sudden pull upon the cord, to thereby permit said case and parts supported by it to fall and draw down the pole, substantially as described.

9. The combination with a trolley-pole, its cord, a spring-actuated reel for the slack cord, a case for said reel, a detent for engaging and holding said case in elevated position, and means for locking the cord and for also disengaging the detent and case operated by a sudden pull upon the cord, substantially as described.

10. The combination with a trolley-pole, its cord, a spring-actuated reel for the slack cord, a case for said reel, an upright support on which said case is free to slide, a detent for engaging and holding said case in elevated position, and means for locking the cord to thereby catch the pole, and also disengage said detent and case operated by a sudden pull upon the cord, substantially as described.

11. The combination with a trolley-pole, its cord, a spring-actuated reel for the slack cord, a locking device and spring for normally holding it in disengaging position, a cord-deflecting arm for operating said locking device, which engages and deflects the cord and which is operated by a sudden pull upon the cord to actuate said locking device, substantially as described.

12. The combination with a trolley-pole, its cord, and a spring-actuated reel for the slack cord, of a cord-holder, a gripping-jaw for impinging the cord on said cord-holder, a cord-deflecting arm connected to said gripping-jaw, which engages and deflects the cord and which is operated by a sudden pull upon the cord to actuate said gripping-jaw, substantially as described.

13. The combination with a trolley-pole, its cord, and a spring-actuated reel for the slack cord, of a cord-holder, a gripping-jaw for impinging the cord on said cord-holder, a cord-deflecting arm connected to said gripping-jaw, which engages and deflects the cord and which is operated by a sudden pull upon the cord to actuate said gripping-jaw, and a spring for holding said gripping-jaw normally removed from said cord-holder, substantially as described.

14. The combination with a trolley-pole, its cord, a spring-actuated reel for the slack cord, of a cord-holder, a gripping-jaw for impinging the cord on said cord-holder, a cord-deflecting arm connected to said gripping-jaw, which engages and deflects the cord and which is operated by a sudden pull upon the cord to actuate said gripping-jaw, and an eye on said cord-deflecting arm through which the cord passes, substantially as described.

15. The combination with a trolley-pole, its cord, a spring-actuated reel for the slack cord, and pole-catching mechanism operated by a sudden pull upon the cord, of a case containing said reel and pole-catching mechanism, having a hinged door at its front side provided with a hand-receiving opening, substantially as described.

16. The combination with a trolley-pole, its cord, a spring-actuated reel for the slack cord, of an eccentrically-pivoted cord-holding disk and gripping-jaw for impinging the cord on said disk, a cord-deflecting arm connected to said gripping-jaw which engages and deflects the cord and which is operated by a sudden pull upon the cord to actuate said gripping-jaw, substantially as described.

In testimony whereof I have signed my name to this specification in the presence of two subscribing witnesses.

WILLIAM E. PETTEE.

Witnesses:
B. J. NOYES,
H. B. DAVIS.